United States Patent [19]
Earnest et al.

[11] Patent Number: 6,092,116
[45] Date of Patent: Jul. 18, 2000

[54] DMA CONTROLLER WITH RESPONSE MESSAGE AND RECEIVE FRAME ACTION TABLES

[75] Inventors: Tim Earnest, Vadnais Heights; Chris Sonnek, North St. Paul, both of Minn.

[73] Assignee: LSI Logic Corporation, Milpitas, Calif.

[21] Appl. No.: 08/761,986

[22] Filed: Dec. 11, 1996

[51] Int. Cl.[7] .............................. G06F 13/00; G06F 13/28
[52] U.S. Cl. .......................... 709/236; 709/212; 709/213; 709/214; 709/245; 710/5; 710/22; 710/23; 710/30
[58] Field of Search ..................................... 395/841–846, 395/821, 823–827, 200.75, 200.76, 200.81, 838, 872–880; 709/212–215, 236–237, 245–246, 250; 710/1, 3–7, 21–26, 30

[56] References Cited

U.S. PATENT DOCUMENTS

| | | | |
|---|---|---|---|
| 4,847,750 | 7/1989 | Daniel ........................................ | 710/25 |
| 5,163,136 | 11/1992 | Richmond ................................. | 710/30 |
| 5,414,813 | 5/1995 | Shiobara .................................. | 709/245 |
| 5,542,110 | 7/1996 | Minagawa ............................... | 710/107 |
| 5,619,497 | 4/1997 | Gallagher et al. ....................... | 370/394 |
| 5,717,952 | 2/1998 | Christiansen et al. ................... | 710/22 |
| 5,809,341 | 9/1998 | Nimishakvi et al. .................... | 710/60 |
| 5,822,618 | 10/1998 | Ecclesine ................................ | 710/57 |

OTHER PUBLICATIONS

"MU95C5480 LANCAM, "*Music Semiconductors*, Rev. 0, pp.1–12. (Jul. 22, 1994).

"Information technology –Telecommunications and information exchange between systems –High–level data link control (HDLC) procedures –Elements of procedures, "*ISO/IEC 4335*, Fifth edition. (Dec. 15, 1993).

"Information technology –Telecommunications and information exchange between systems –High–level data link control (HDLC) procedures –Frame structure", *ISO/IEC 3309*, Fifth edition. (Dec. 15, 1993).

W. Simpson, Editor, Daydreamer, "PPP in HDLC–like Framing, "pp. 1–25, (last modified Jul. 1994) <ftp://ds.internic.net/rfc>.

*Primary Examiner*—Zarni Maung
*Assistant Examiner*—Bharat Barot
*Attorney, Agent, or Firm*—Westman, Champlin & Kelly, P.A.

[57] ABSTRACT

A direct memory access (DMA) controller transmits and receives formatted data frames having frame headers in a communications subsystem. The DMA controller includes a transmit input and output, a receive input and output, transmit circuitry, receive circuitry, a receive frame header capture circuit, a receive frame action table and a response message table. The transmit circuitry receives transmit data frames on the transmit input and applies the transmit data frames to the transmit output. The receive circuitry receives receive data frames on the receive input and applies the receive data frames to the receive output. The receive frame header capture circuit obtains a frame header from the received data frames and applies the frame header to the receive frame action table. The receive frame action table generates a frame action command based on the frame header field. The response message table has an address input coupled to receive the frame action command, a response frame output coupled to the transmit circuitry and a plurality of addressable memory locations for storing predetermined response data frames.

26 Claims, 13 Drawing Sheets

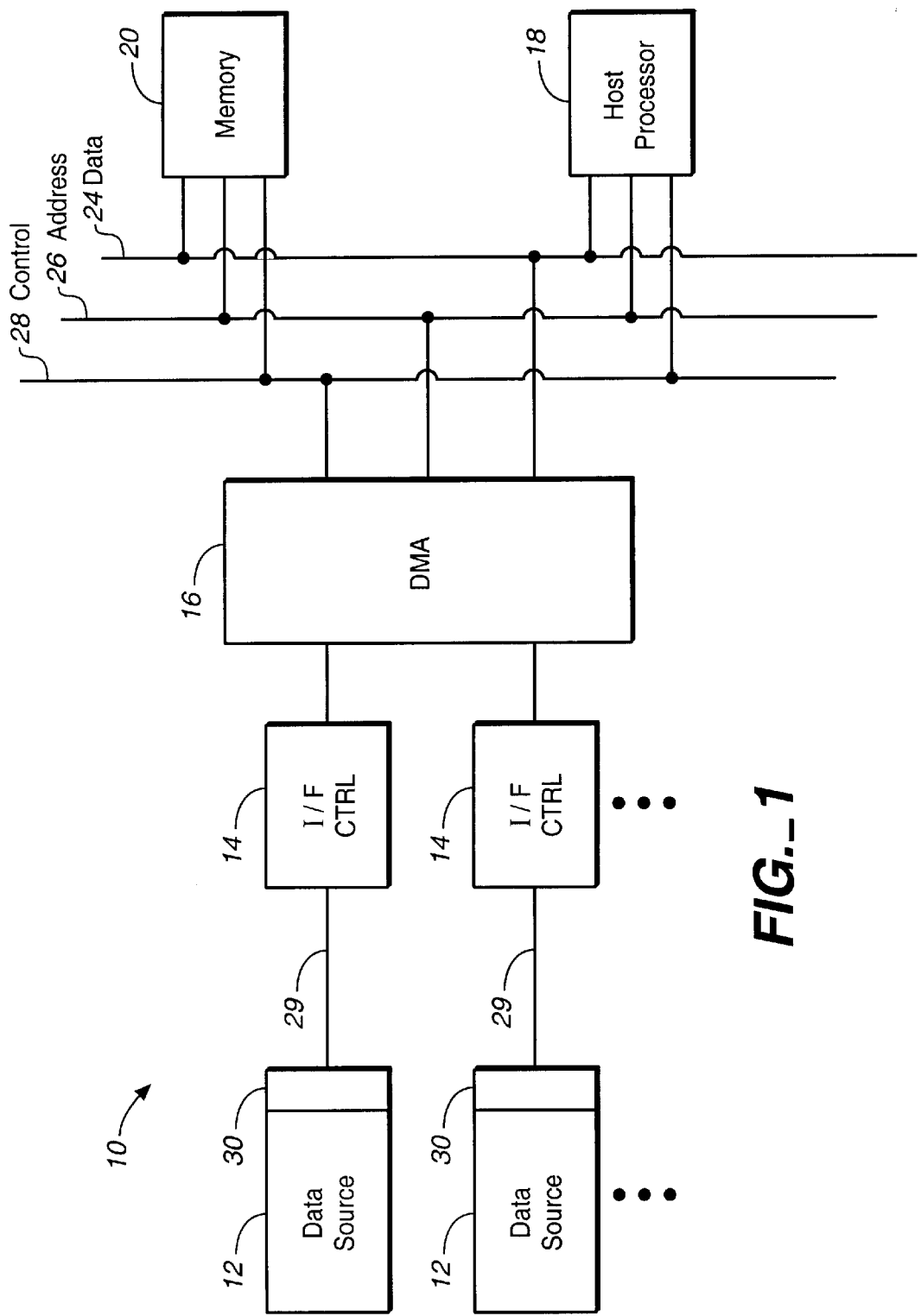
FIG._1

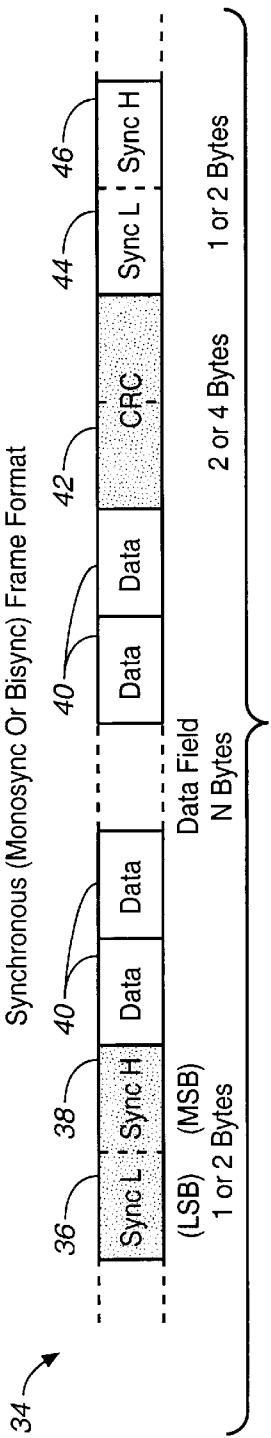
FIG._2
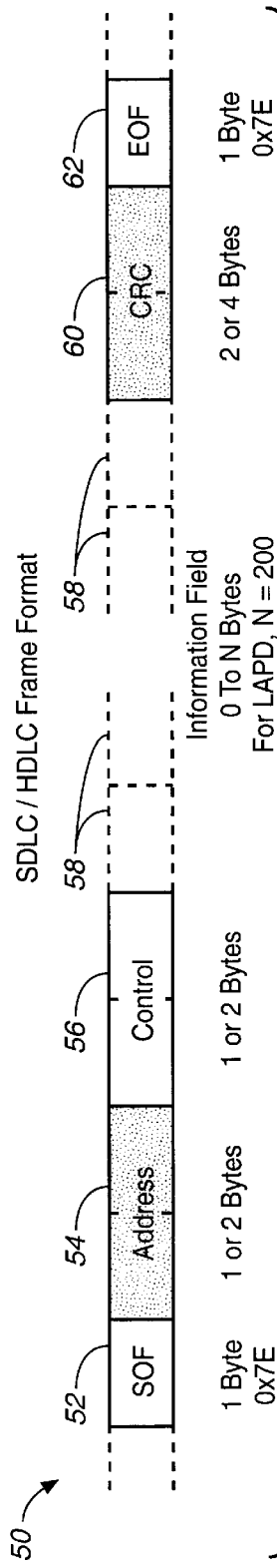
FIG._3
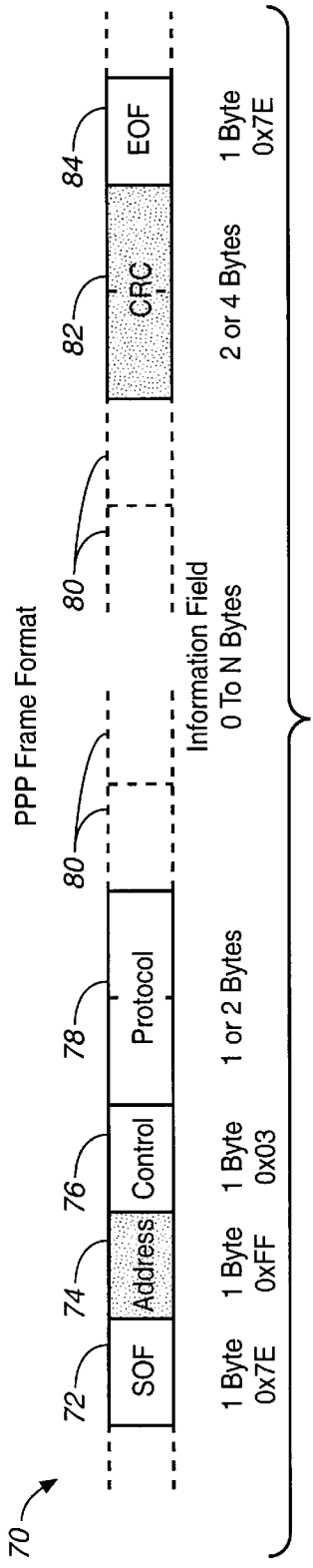
FIG._4

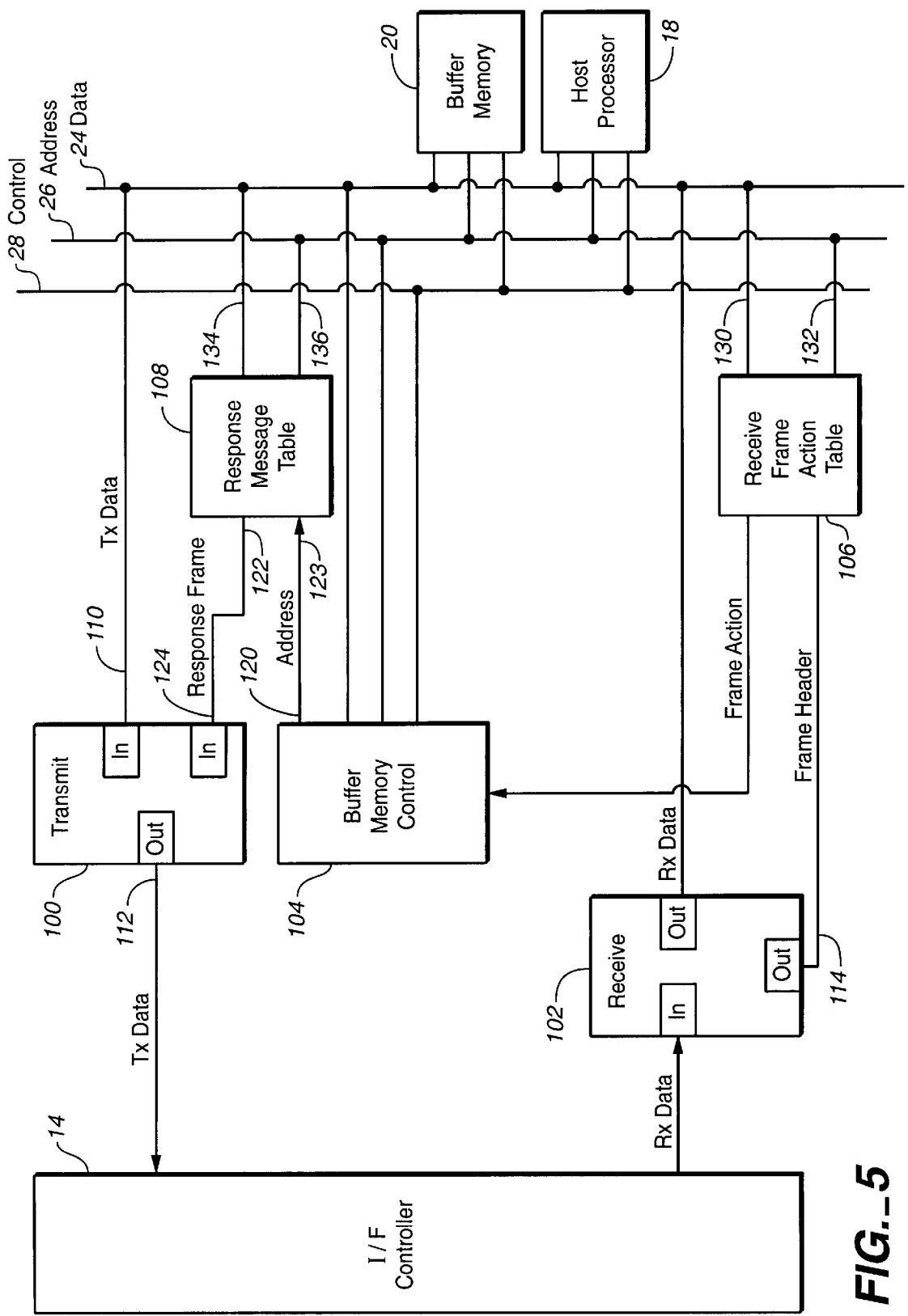
FIG._5

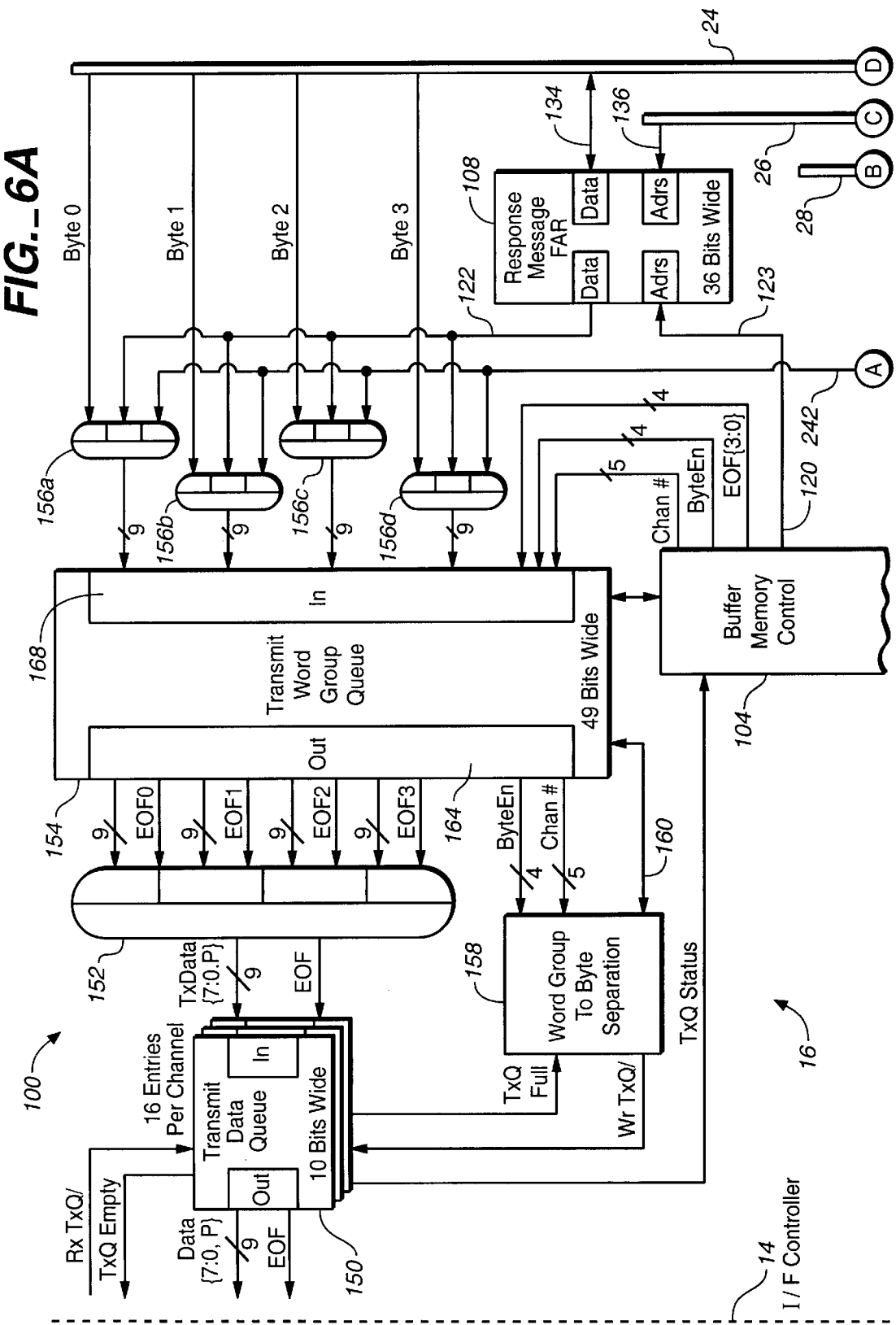
FIG._6A

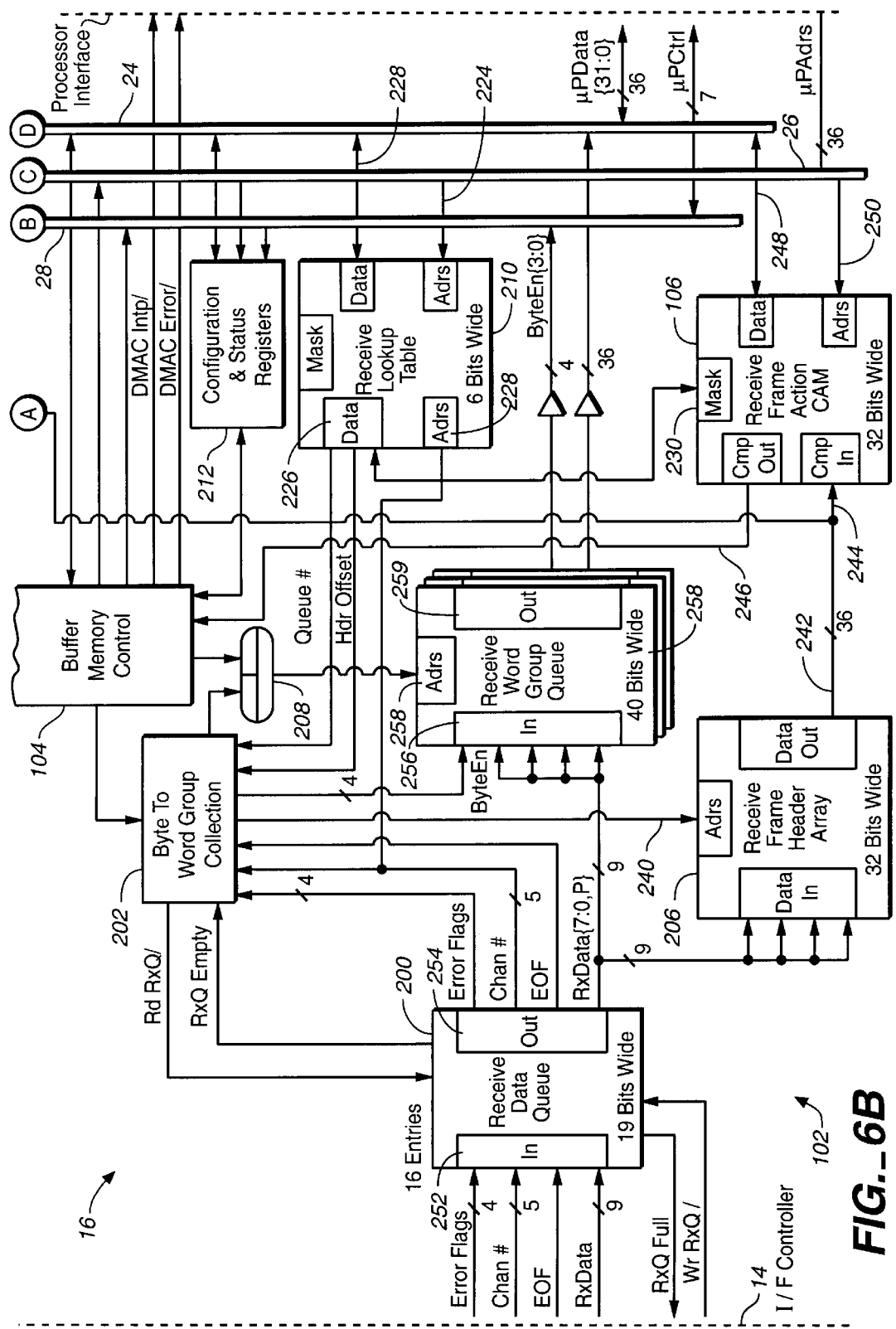
FIG._6B

FIG._7

Queue # Lookup Table (Adrs 0x1000 - 0x107C) Definitions

| Hex Adrs | Description | Wr / Rd | msb 31 Byte 0 24 | 23 Byte 1 16 | 15 Byte 2 8 | 7 Byte 3 lsb 0 |
|---|---|---|---|---|---|---|
| 1000 | Chan 0 Lookup | Wr / Rd | | CAM Mask | Hdr Offset | Queue # |
| 1004 | Chan 1 Lookup | Wr / Rd | | CAM Mask | Hdr Offset | Queue # |
| ---- | ---- | | | | | |
| 107C | Chan 31 Lookup | Wr / Rd | | CAM Mask | Hdr Offset | Queue # |

210 → Queue # Lookup Table

FIG._8

Receive Frame Action CAM (Adrs 0x2000 - 0x21FC) Definitions

| Hex Adrs | Description | Wr / Rd | msb 31 Byte 0 24 | 23 Byte 1 16 | 15 Byte 2 8 | 7 Byte 3 lsb 0 |
|---|---|---|---|---|---|---|
| 2000 | Locn 0 Cmp In | Wr / Rd | Byte 0 | Byte 1 | Byte 2 | Byte 3 |
| 2004 | Locn 0 Cmp Out | Wr / Rd | | | | Frame Action |
| ---- | ---- | | | | | |
| 21F8 | Locn 63 Cmp In | Wr / Rd | Byte 0 | Byte 1 | Byte 2 | Byte 3 |
| 21FC | Locn 63 Cmp Out | Wr / Rd | | | | Frame Action |

106 → Receive Frame Action CAM

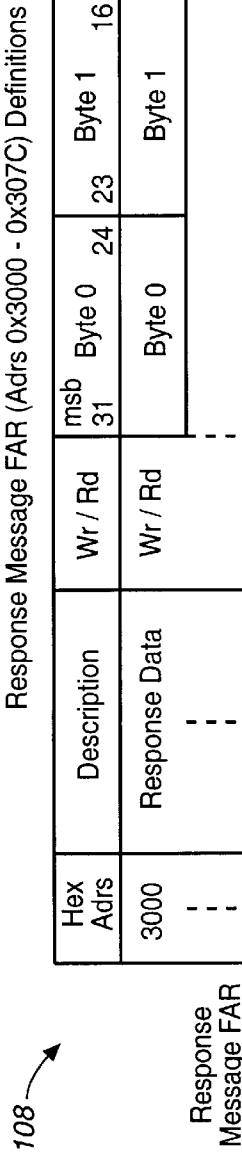
FIG._9
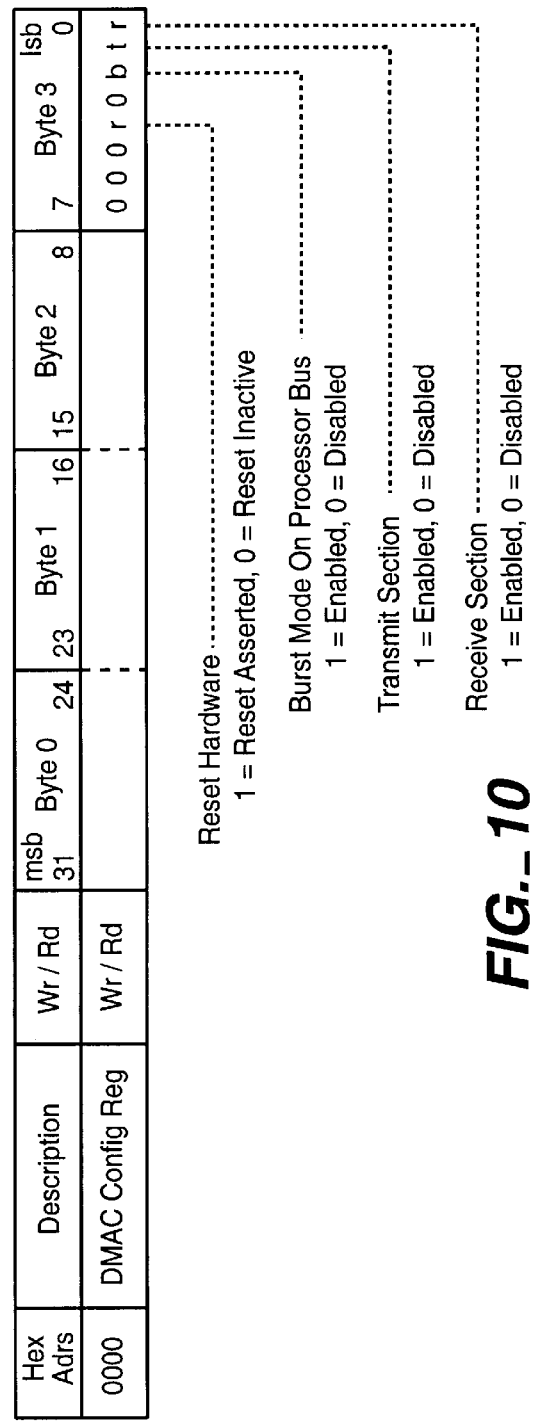
FIG._10

Channel Enable Register (Adrs 0x0004) Bit Definitions

| Hex Adrs | Description | Wr / Rd | msb 31 Byte 0 24 | 23 Byte 1 16 | 15 Byte 2 8 | 7 Byte 3 lsb 0 |
|---|---|---|---|---|---|---|
| 0004 | Chan Enable Reg | Wr / Rd | eeeeeeee | eeeeeeee | eeeeeeee | eeeeeeee |

BMD Pointer Registers (Adrs 0x0100 - 0x01FC) Definitions

| Hex Adrs | Description | Wr / Rd | msb 31 Byte 0 24 | 23 Byte 1 16 | 15 Byte 2 8 | 7 Byte 3 lsb 0 |
|---|---|---|---|---|---|---|
| 0100 | Chan 0 Tx Pntr | Wr / Rd | Transmit Channel 0 Buffer Memory Descriptor Pointer | | | a |
| 0104 | Chan 1 Tx Pntr | Wr / Rd | Transmit Channel 1 Buffer Memory Descriptor Pointer | | | a |
| ---- | ---- | | | | | |
| 017C | Chan 31 Tx Pntr | Wr / Rd | Transmit Channel 31 Buffer Memory Descriptor Pointer | | | a |
| 0180 | Chan 0 Rx Pntr | Wr / Rd | Receive Channel 0 Buffer Memory Descriptor Pointer | | | a |
| 0184 | Chan 1 Rx Pntr | Wr / Rd | Receive Channel 1 Buffer Memory Descriptor Pointer | | | a |
| ---- | ---- | | | | | |
| 018C | Chan 31 Rx Pntr | Wr / Rd | Receive Channel 31 Buffer Memory Descriptor Pointer | | | a |

{ 0100–017C } Transmit Pointers
{ 0180–018C } Receive Pointers

DMAC Status Register (Adrs 0x0008) Bit Definitions

| Hex Adrs | Description | Wr/Rd | msb Byte 0 31    24 | Byte 1 23    16 | Byte 2 15    8 | Byte 3 7    lsb 0 |
|---|---|---|---|---|---|---|
| 0008 | Status Register | Wr/Rd | | | t r 0 c c c c c c | o o u u p 0 t r |

Transmit BMD Not Ready
Transmit BMD Fetched And Valid Bit Not Set.

Receive BMD Not Ready
Receive BMD Fetched And Valid Bit Not Set.

Channel # Of Not Ready BMD

Transmit Data Queue Overrun
Transmit Data Queue Was Full When Data Was Written.

Transmit World Group Queue Overrun
Transmit Word Group Queue Was Full When Data Was Written.

Receive Data Queue Underrun
Receive Data Queue Was Empty When Data Was Read.

Receive Word Group Queue Underrun
Receive Word Group Queue Was Empty When Data Was Read.

uP Data Parity Error
Parity Error Detected On uPData Bus During Transmit Operation.

Transmit Completion Interrupt Active

Receive Completion Interrupt Active

FIG._12

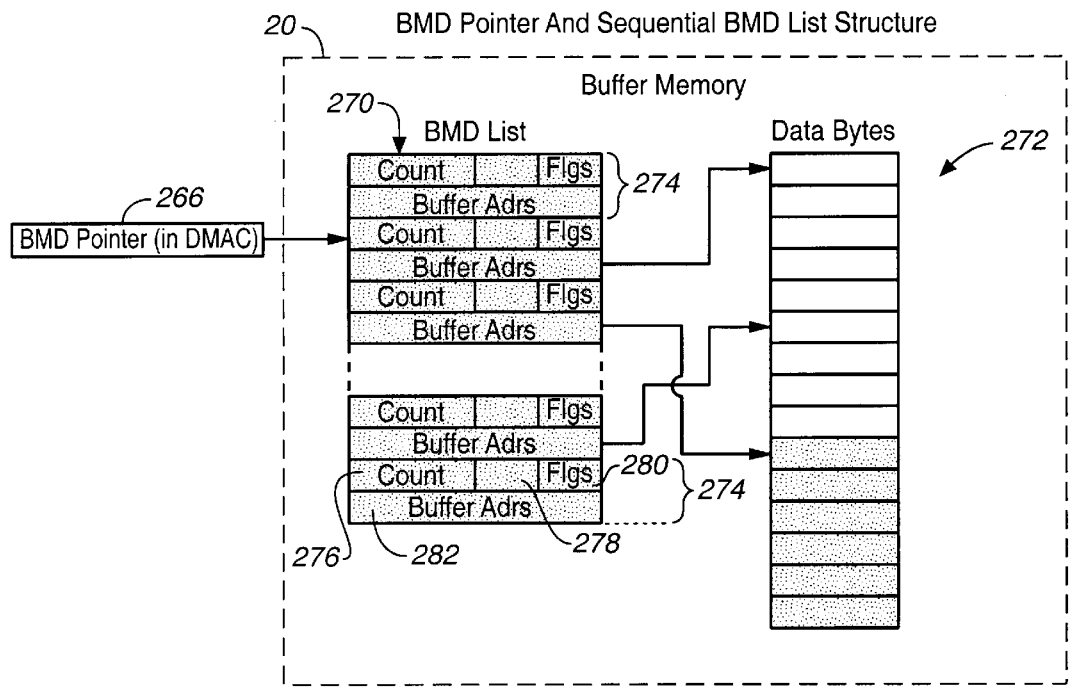
FIG._14
Buffer Memory Descriptor (BMD) Definition
| Hex Offset | Description | msb 31  Byte 0  24 | 23  Byte 1  16 | 15  Byte 2  8 | 7  Byte 3  lsb 0 |
|---|---|---|---|---|---|
| 0000 | Word 0 | Byte Count | | Immed Cmd | Flags |
| 0004 | Word 1 | Buffer Memory Address | | | |
274  276  282                         278  280
FIG._15

Buffer Memory Descriptor Immediate Cmd & Flags Bit Definitions

| Hex Offset | Description | msb Byte 0 31 | 24 | 23 | Byte 1 | 16 | 15 | Byte 2 | 8 | 7 | Byte 3 | lsb 0 |
|---|---|---|---|---|---|---|---|---|---|---|---|---|
| 0000 | Word 0 | Byte Count | | | | | Immed Cmd 0 0 0 0 0 0 0 r | | | Flags e e e e i s e v | |

276 — 278 — 280

Send Response Frame
  1 = Send Frame From Response Message FAR
  0 = Normal Data Transfer From Buffer Memory Error Flags {3:0} (Rx Only)
  Error Flags Received Via The Receive Data Queue.

Buffer Completion Interrupt
  Send A Completion Interrupt When The Data Frame Has Transferred.

Start Of Frame (SOF)
  This BMD Is The First Buffer Of A Data Frame.

End Of Frame (EOF)
  This BMD Is The Last Buffer Of A Data Frame.

Valid
  The Parameters In The BMD Are Valid.

*FIG._16*

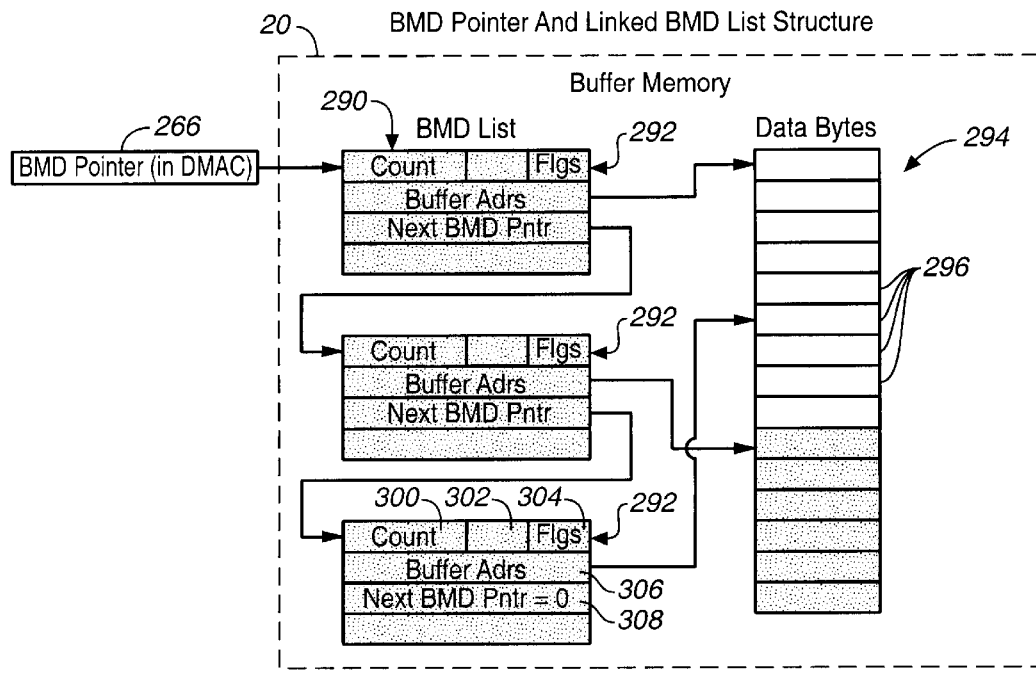
FIG._17
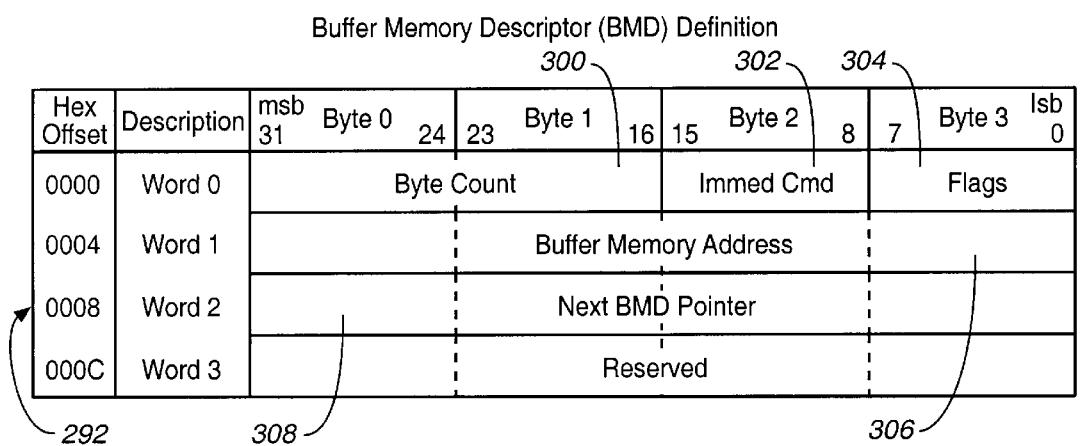
FIG._18

Buffer Memory Descriptor Immediate Cmd & Flag Bit Definitions

| Hex Offset | Description | msb Byte 0 31 | 24 | Byte 1 23 | 16 | Byte 2 15 | 8 | Byte 3 7 | lsb 0 |
|---|---|---|---|---|---|---|---|---|---|
| 0000 | Word 0 | Byte Count | | | | Immed Cmd 0 0 0 0 0 0 0 r | | Flags e e e e i s e v | |

300
302
304

Send Response Frame
  1 = Send Frame From Response Message FAR
  0 = Normal Data Transfer From Buffer Memory Error Flags {3:0} (Rx Only)
  Error Flags Received Via The Receive Data Queue.

Buffer Completion Interrupt
  Send A Completion Interrupt When The Data Frame Has Transferred.

Start Of Frame (SOF)
  This BMD Is The First Buffer Of A Data Frame.

End Of Frame (EOF)
  This BMD Is The Last Buffer Of A Data Frame.

Valid
  The Parameters In This BMD Are Valid.

*FIG._19*

DMA CONTROLLER WITH RESPONSE MESSAGE AND RECEIVE FRAME ACTION TABLES

BACKGROUND OF THE INVENTION

The present invention relates to digital communications circuits and, more particularly, to a Direct Memory Access (DMA) controller having enhanced data frame processing circuitry.

A typical communications subsystem includes a physical layer interface controller, such as a serial Wide Area Network (WAN) controller, which is coupled to a communications line for transmitting data to and receiving data from a remote data source. A DMA controller is coupled between the interface controller and a host processor data bus for communication with a host processor and its associated memory. Data is typically transmitted and received in data frames. Each data frame includes a frame header field and a data field. The frame header field typically includes a frame address field, a frame control field and a frame protocol field.

When the interface controller receives a data frame from the remote data source, the data frame is passed through the interface controller to the DMA controller. The DMA controller writes the data frame to the host processor memory and then notifies the host processor that data has arrived. The host processor then looks at the data frame in the host processor memory and makes a decision on what to do with the data frame and where to route the data frame. The host processor then transfers the data frame to its destination.

High Level Data Link Control (HDLC), Synchronous Data Link Control (SDLC), and Point to Point (PPP) link layer protocols normally send "response" frames in response to "request" data frames. If a request data frame has been received in the host processor memory, the host processor creates a response frame in the host processor memory to acknowledge receipt of the data frame. The host processor notifies the DMA controller to transfer the response frame from the host processor memory to the data source through the interface controller. The DMA controller then transfers the response data frame.

This procedure requires large processing overhead. First, the host processor consumes valuable processing time looking at data frames in the host processor memory and making decisions on what to do with the data frames and where to route the data frames. The host processor also consumes valuable processing time creating response frames and notifying the DMA controller to transfer the response frames. Finally, the DMA controller uses valuable bandwidth on the host processor data bus getting the response frames from the host processor memory. Thus, there is a need for a communications subsystem having increased efficiency and data throughput.

SUMMARY OF THE INVENTION

The direct memory access (DMA) controller of the present invention transmits and receives formatted data frames having frame headers in a communications subsystem. The DMA controller includes a transmit input and output, a receive input and output, transmit circuitry, receive circuitry and a response message table. The transmit circuitry receives transmit data frames on the transmit input and applies the transmit data frames to the transmit output. The receive circuitry receives receive data frames on the receive input and applies the receive data frames to the receive output. The response message table has an address input coupled to the receive circuitry, a response frame output coupled to the transmit circuitry and a plurality of addressable memory locations for storing predetermined response data frames.

In one embodiment, the DMA controller further includes a frame header capture circuit which captures the frame header of each receive data frame and a receive frame action table which determines an action to be performed on the receive data frame as a function of the captured frame header. When the receive frame action table determines that a response frame should be transmitted from the response message table, the receive frame action table provides the response message table with the address at which the desired response frame is stored. A host processor coupled to the DMA controller can also transmit any response frame from the response message table.

BRIEF DESCRIPTION OF THE DRAWINGS

FIG. 1 is a block diagram of a communications circuit according to one embodiment of the present invention.

FIG. 2 is a diagram illustrating a synchronous data frame format.

FIG. 3 is a diagram illustrating an SDLC/HDLC protocol frame format.

FIG. 4 is a diagram illustrating a PPP protocol frame format.

FIG. 5 is a simplified block diagram of a DMA controller shown in FIG. 1.

FIGS. 6A and 6B together form a more detailed block diagram of the DMA controller shown in FIG. 1 according to one embodiment of the present invention.

FIG. 7 is a diagram which illustrates the bit definitions of a queue # look up table.

FIG. 8 is a diagram which illustrates the bit definitions of a receive frame action table.

FIG. 9 is a diagram which illustrates the bit definitions of a response message table.

FIG. 10 is a diagram illustrating the bit definitions of a configuration register within the DMA controller.

FIG. 11 is a diagram illustrating the bit definitions of a channel enable register within the DMA controller.

FIG. 12 is a diagram illustrating the bit definitions of a DMAC status register.

FIG. 13 is a diagram illustrating the bit definitions of a BMD pointer register.

FIG. 14 is a diagram which illustrates the data structure of a buffer memory having a sequential buffer memory descriptor (BMD) list.

FIG. 15 is a diagram illustrating the bit definitions of a buffer memory descriptor within the sequential BMD list shown in FIG. 14.

FIG. 16 is a diagram illustrating the bit definitions of an immediate command field and flags field within the sequential BMD list shown in FIG. 14.

FIG. 17 is a diagram which illustrates the data structure of a buffer memory having a linked BMD list.

FIG. 18 is a diagram illustrating the bit definitions of a buffer memory descriptor in the linked BMD list shown in FIG. 17.

FIG. 19 is a diagram illustrating the bit definitions of a buffer memory descriptor intermediate command field and flags field in the linked BMD list shown in FIG. 17.

DETAILED DESCRIPTION OF THE PREFERRED EMBODIMENTS

The DMA controller of the present invention is used with communications protocols in which formatted data frames are transmitted from one point to another. Formatted data frames include a frame header field and a data field. A typical frame header field includes a frame address field, a frame control field and a frame protocol field. These fields determine the destination of the data frame and the type of data frame. The DMA controller of the present invention increases efficiency and data throughput by using specialized memory arrays which assist in processing data frames and triggering automatic response frames.

FIG. 1 is a block diagram of a communications circuit according to one embodiment of the present invention. Communications circuit 10 includes a plurality of data sources 12, a plurality of interface controllers 14, a DMA controller 16, a host processor 18, and a host processor buffer memory 20. DMA controller 16, host processor 18, and buffer memory 20 are coupled to one another through host processor data bus 24, address bus 26 and control bus 28. A communications cable 29 is coupled between each data source 12 and its associated interface controller 14. Each data source 12 includes a physical layer interface 30 which has transmit and receive circuitry for communicating over cable 29. In one embodiment, each interface controller 14 includes a serial Wide Area Network (WAN) controller which enables high speed serial communications over several types of synchronous serial channels. However, other types of controllers or physical interfaces can be used with the present invention.

Data frames are passed from data source 12 through cable 29 and interface controller 14 to DMA controller 16. DMA controller 16 writes the received data frame to memory 20 over host processor data bus 24 and then notifies host processor 18 that data has arrived. Host processor 18 then transfers the data frame to its destination, which may be another location within buffer memory 20 or another device coupled to data bus 24. In the case where the received data frame includes a control message, host processor 18 performs an operation that is defined in the control message.

DMA controller 16 relieves host processor 18 from some of its decision making responsibilities by determining what action to take on an incoming data frame based on the frame header field. The action can include discarding the data frame, generating a host processor interrupt or sending a response frame, for example. A response frame can be triggered automatically by DMA controller 16 or DMA controller 16 can be instructed by host processor 18 to send a response frame. In addition, host processor 18 can initiate transmission of data frames from buffer memory 20 through DMA controller 16 and interface controllers 14.

Several communications protocols can be used with the present invention, such as Synchronous Data Link Control (SDLC), High Level Data Link Control (HDLC) and Point to Point (PPP) link layer protocols. In synchronous communications, serial data streams include individual data bits which are separated by bit boundaries. FIG. 2 is a diagram illustrating a generalized data frame format for synchronous data frames. Data frame 34 includes synchronizing fields 36 and 38, data fields 40, Cyclic Redundancy Check (CRC) field 42 and synchronizing fields 44 and 46. For synchronous data, start and stop bits are not used. Instead, the data is transferred in frames with no gaps between characters. Each data frame is separated by either one synchronizing character or two synchronizing characters within fields 36, 38, 44 and 46. The same synchronizing characters are used at the beginning of data frame 34 and at the end of data frame 34, and are used as Start of Frame (SOF) and End of Frame (EOF) characters (e.g. field 36=0x44 and field 38=0x44, where "Ox" designates a hexa-decimal number). An EOF character for one data frame can be used as an SOF character for the next data frame.

FIG. 3 is a diagram of a synchronous data frame format according to the SDLC/HDLC protocol. Data frame 50 includes SOF field 52, frame address field 54, frame control field 56, information fields 58, CRC field 60 and EOF field 62. SDLC/HDLC is a bit oriented synchronous protocol which transmits data in frames using one synchronizing character (e.g. field 52=0x7E and field 62=0x7E). The frame begins when the SOF character is received and ends when an EOF character is received. As mentioned above, the EOF character for one frame can be the SOF character for the next frame.

FIG. 4 is a diagram of a synchronous data frame format according to the PPP protocol. Data frame 70 includes SOF field 72, address field 74, control field 76, protocol field 78, information fields 80, CRC field 82 and EOF field 84. PPP is a byte orientated synchronous protocol. PPP transmits data in frames, similar to the HDLC protocol, using one synchronizing character (e.g. field 72=0x7E and field 84=0x7E). The frame begins when an SOF character is received and ends when an EOF character is received. An EOF character for one frame can be the SOF character for the next frame.

FIG. 5 is a simplified block diagram of DMA controller 16. DMA controller 16 includes transmit circuitry 100, receive circuitry 102, buffer memory control circuit 104, receive frame action table 106 and response message table 108. Buffer memory control circuit 104 controls the operation of transmit circuitry 100, receive circuitry 102, receive frame action table 106 and response message table 108 according to internal logic and commands passed from host processor 18 through data bus 24, address bus 26 and control bus 28. In transmit mode, transmit circuitry 100 receives transmit data (labelled "TxData") at input 110 from buffer memory 20 over host processor data bus 24. Transmit circuitry 100 then transmits the data to interface controller 14 at output 112 under the control of buffer memory control circuit 104.

In receive mode, receive data frames (labelled "RxData") are passed from interface controller 14 to receive circuitry 102. Receive circuitry 102 then writes the received data frames to buffer memory 20 over data bus 24, under the control of buffer memory control circuit 104, and notifies host processor 18 that data has arrived. Receive circuitry 102 also identifies the frame header (fields 54 and 56 in FIG. 3 or 74, 76 and 78 in FIG. 4) within the data frame and supplies the frame header to receive frame action table 106 over output 114. Receive frame action table 106 stores a plurality of predetermined frame action fields, which define the actions to be taken when corresponding frame headers have been received. When a frame header is presented at the input of frame action table 106, table 106 provides the corresponding frame action field to buffer memory control circuit 104 to inform the control circuit of the action to take on the newly received data frame. In one embodiment, the frame action field instructs buffer memory control circuit 104 to discard the received data, generate a host processor interrupt or send a response frame from response message table 108.

Response message table 108 stores a plurality of predetermined response data frames. When the frame action field indicates that a response message should be sent, the frame action field includes an address which identifies the desired response message residing in response message table 108. Buffer memory control circuit 104 receives the address and provides the address to response message table 108 at output 120. Response message table 108 receives the address at input 123 and provides the corresponding response data frame on output 122, which is coupled to input 124 of transmit circuitry 100. Transmit circuitry 100 then transmits the response data frame on output 112. If required, host processor 18 has the option of sending its own response data frame back to the data source from host processor buffer memory 20 over data bus 24.

Receive frame action table 106 and response message table 108 are both programmable by host processor 18. Receive frame action table 106 includes data input 130 and address input 132 which are coupled to host processor data bus 24 and address bus 26, respectively. Similarly, response message table 108 includes data input 134 and address input 136 which are coupled to host processor data bus 24 and address bus 26. These inputs allow host processor 18 to initialize or reprogram tables 106 and 108, as desired, which allows host processor 18 to maintain control over all aspects of data frame decision making and response frame generation. The interface with host processor 18 include a MIPS or generic processor interface, for example.

FIGS. 6A and 6B together form a more detailed block diagram of DMA controller 16 according to one embodiment of the present invention in which the DMA controller is adapted to be used with any interface controller core that transmits or receives data into an 8-bit (plus an optional parity bit) queuing interface.

Transmit circuitry 100 is shown in FIG. 6A. Transmit circuitry 100 includes transmit data queue 150, multiplexer 152, transmit word group queue 154, multiplexers 156a–156d and word group to byte separation circuit 158. Each multiplexer 156a–156d simultaneously receives a corresponding byte of data, Byte 0, Byte 1, Byte 2 and Byte 3, from host processor data bus 24 and provides the bytes of data to transmit word group queue 154 when directed by buffer memory control circuit 104. Multiplexers 156a–156d also receive inputs from output 122 of response message table 108 and from output 242 of receive frame header array 206 (shown in FIG. 6B) The outputs of multiplexers 156a–156d are coupled to input 168 of transmit word group queue 154.

Input 168 also receives a 5-bit channel number Chan #, a 4-bit byte enable signal Byte En and a 4-bit End of Frame signal EOF {3:0} from buffer memory control circuit 104, which are matched with the incoming data bytes. Transmit word group queue 154 has an output 164 which provides four bytes of data and their corresponding end of frame bits EOF0–EOF3 to multiplexer 152. The corresponding byte enable signal Byte En and channel number Chan # are routed to word group to byte separation circuit 158. Multiplexer 152 is operated under the control of word group to byte separation circuit 158 which selects one data byte at a time and its corresponding end of frame bit for transmission to transmit data queue 150. The selected data byte and end of frame bit form a transmit data signal TxData{7:0,P} and an end of frame signal EOF.

Transmit data queue 150 includes a plurality of channels with each channel storing up to 16 data bytes, which are ten bits wide, for transmission to the corresponding interface controller 14. The size of each channel and the number of channels can be varied as desired to suit a particular application. Each transmit data byte and its corresponding parity bit and EOF bit are stored as an entry in the appropriate channel of transmit data queue 150.

Word group to byte separation circuit 158 receives the 4-bit byte enable signal Byte En and the 5-bit channel number Chan # from transmit word group queue 154 for every four bytes of data transferred through multiplexer 152. Word group to byte separation circuit 158 provides a write control signal Wr TxQ/ to each channel of transmit data queue 150. Write control signal Wr TxQ/ is active when the Byte En signal for the corresponding Chan # is active. When write control signal Wr TxQ/ is active, the selected transmit data byte TxData{7:0,P} and EOF bit at the output of multiplexer 152 is stored in the corresponding, enabled channel of transmit data queue 150. Transmit data queue 150 provides a transmit queue full signal TxQ Full to word group to byte separation circuit 158 when the corresponding channel in queue 150 is full. Transmit data queue 150 also provides a transmit queue status signal TxQ Status to buffer memory control circuit 104.

Each channel of queue 150 has a 9-bit data output Data{7:0,P}, an end of frame output EOF and a transmit queue empty status output TxQ Empty which are coupled to the corresponding interface controller 14. When a channel of queue 150 is empty, the TxQ Empty status output for that channel is active. Each channel of queue 150 receives a read transmit queue control signal Rd TxQ/ from the corresponding interface controller 14. The Rd TxQ signal is active when the corresponding interface controller 14 is requesting a data byte to be transmitted from transmit data queue 150. Transmission of data out of queue 150 is asynchronous to writing data into the queue.

Buffer memory control circuit 104 operates transmission circuitry 100 to multiplex data transmission through the various channels. In one embodiment, each channel is given an equal time to share access to buffer memory 20 in order to prevent overruns and underruns in any particular queue channel. This process is achieved in DMA controller 16 using word groups. A word group is a collection of about 1 to 16 bytes of information that are transmitted to or from buffer memory 20. In a preferred embodiment, a full word group includes four words, with each full word including four bytes of data. The actual number of bytes transferred in each word or word group depends on the address and byte count of the data buffer that is being accessed within buffer memory 20. When the buffer address begins on an odd boundary, such as in the middle of a word boundary within a data frame, DMA controller 16 first transfers one to four bytes of information to reach a full word boundary. DMA controller then transfers up to four words to reach a four word (word group) boundary. Once a word group boundary is reached, DMA controller 16 transfers the data in four word bursts, until the last bytes of data within the data frame are transferred. This allows data to be transferred along word boundaries.

Buffer memory control circuit 104 transfers one word group per DMA channel from buffer memory 20 to the transmit word group queue 154 through host processor data bus 24 and multiplexers 156a–156d. The specified Chan # and the four Byte En bits accompany each data word through transmit word group queue 154. While buffer memory control circuit 104 is getting another word group from buffer memory 20, word group to byte separation circuit 158 moves the present word group into the appropriate channel of transmit data queue 150, one byte at a time. A byte is discarded if it does not have its respective Byte En signal active.

Receive circuitry 102 is shown in FIG. 6B. Receive circuitry 102 includes receive data queue 200, byte to word group collection circuit 202, receive word group queue 204, receive frame header array 206, receive frame action table 106, multiplexer 208 and queue # look up table 210. DMA controller 16 also includes a configuration and status register block 212 which is coupled to buffer memory control circuit 104.

In one embodiment, receive data queue 200 stores up to 16 entries locations, with each entry being 19 bits wide. Only one receive data queue 200 is required for all multiplexed channels. Receive data queue 200 has an input 252 which receives 19 bits of data from an interface controller 14. The 19 bits of data include an 8-bit, plus parity receive data signal RxData{7:0,P}, an end of frame bit EOF, a 5-bit channel number Chan #, and a 4-bit error flag signal Error Flags. Receive data queue also receives a write receive queue control signal Wr RxQ/ from interface controller 14 which is active when receive data is to be written in queue 200.

In return, receive data queue 200 provides a receive queue full status signal RxQ Full to interface controller 14 to indicate when receive data queue 200 is full. Receive data queue 200 has an output 254 at which one byte of stored data RxData{7:0,P} is provided when a read receive queue control signal Rd RxQ/ is received from byte to word group collection circuit 202. The 4-bit Error Flags signal, 5-bit Chan # signal and the EOF bit which correspond to the RxData{7:0,P} signal are also provided on output 254. Receive data queue 200 also generates a receive queue empty status signal RxQ Empty when receive data queue 200 is empty. The RxQ Empty status signal is monitored by byte to word group collection circuit 202.

Receive word group queue 204 is formed of a plurality of individual queues. Each queue has a data input 256, an address input 258 and a data output 259 and is 40 bits wide for receiving an entire 36 bit data frame, including associated parity and Byte En bits. Data input 256 receives the RxData{7:0,P} signal from output 254 of queue 200 and a 4-bit byte enable signal Byte En {3:0} from byte to word group collection circuit 202. Address input 258 receives a queue address from multiplexer 208, which specifies the address in queue 204 that the data will be written. The address can be provided by either byte to word group collection circuit 202 or buffer memory control circuit 104. The address at input 258 is a function of the Chan # signal accompanying the data at output 254 and a Queue # signal provided by queue # lookup table 210. The Queue # signal is described in greater detail below. Data output 259 of each channel in queue 204 is coupled to host processor data bus 24, for providing the stored bytes of received data to data bus 24, one word at a time. Output 259 also provides the corresponding 4-bit Byte En signal to host processor control bus 28.

During operation, byte to word group collection circuit 202 gets a byte of data from receive data queue 200 by activating the Rd RxQ/ signal. Byte to word group collection circuit 202 collects data bytes in queue 204 for all channels enabled by block 212. When all bytes of a word group have been collected in receive word group queue 204, byte to word group collection circuit 202 notifies buffer memory control circuit 104 over signal line 220, and buffer memory control circuit 104 writes the word group to buffer memory 20 by providing the appropriate address to multiplexer 208. The selected word group is presented at output 259 of receive word group queue 204 and written to buffer memory 20 over host processor data bus 24. While a word group is being transferred to buffer memory 20, byte to word group collection circuit 202 continues to collect data bytes for all enabled channels.

Queue # lookup table 210 provides parameters for the received data frames. In one embodiment, the lookup table is essentially a dual port Random Access Memory (RAM) which is initialized through a first port at data input 222 and address input 224 by host processor 18 (shown in FIG. 5). Data output 226 and address input 228 form the second port. Address input 228 indexes the stored parameters to be presented at output 226 by using the incoming channel number Chan # from receive data queue 200. Each storage location within queue # lookup table 210 contains up to 32 bits of parameter information per channel number.

FIG. 7 is diagram which illustrates the bit definitions for each entry within queue # lookup table 210. Three parameters are defined per channel number. Bits 0–7, identified as "Queue #", specify which of the receive queues in queue 204 the received data frame is to be routed to. In one embodiment, the upper three bits of this field are coded as zeros. Bits 8–15, identified "Hdr Offset", define an integer offset which locates the beginning of the four byte frame header field embedded in the received data frame. If the first byte of the data frame is the beginning of the frame header field, then Hdr Offset is set to 0. Bits 16–23, identified as "Mask", are used to mask selected bits of the frame header field provided to receive frame action table 106. Each bit in the mask field can mask one bit or a group of bits in the frame header during a frame header lookup. Bits 24–31 are not defined in this embodiment and are coded as zeros.

Referring back to FIG. 6B, receive frame header array 206 is a small memory array which is used for storing the frame headers of received data frames. For each data frame received, buffer memory control circuit 104 and byte to word group collection circuit 202 capture the four byte (32-bit) frame header field, one byte at time, in receive frame header array 206. When the byte of data presented at output 254 of receive data queue 200 corresponds to a byte of the frame header field, as identified by the Hdr Offset signal, that byte of data is stored in receive frame header array 206. The address at which the data is stored is provided at input 240 by byte to word group collection circuit 202. When all four bytes of the frame header have been captured, receive frame header array 206 routes the frame header field to output 242, which is coupled to comparison input 244 of receive frame action table 106.

Portions of the frame header field can also be routed to transmit word group queue 154 (shown in FIG. 6A) through multiplexers 156a–156d. For example, the frame header field may include a sequence number that may be inserted into a response data frame that is being transmitted from response message table 108 in response to the received data frame. The sequence number is inserted at multiplexers 156a–156d.

Receive frame action table 106 is preferably a Contents Addressable Memory (CAM) array which identifies an action to be performed as a function of the information contained within the frame header field that is applied to comparison input 244. The frame header field is masked with the Mask parameter that is applied to Mask input 230. Comparison output 246 includes a status signal which indicates whether the data within the masked frame header field is found within table 106. If the data is found within table 106, an action field corresponding to the data is provided on comparison output 246. If the data is not found within table 106, table 106 activates the status signal to instruct buffer memory control circuit 104 to discard the incoming data frame or to inform host processor 18 of an unknown incoming data frame. The contents of receive frame action table 106 is initialized by host processor 18 through data input 248 and address input 250.

FIG. 8 is a diagram illustrating the format of each entry within receive frame action table 106. In one embodiment, table 106 includes up to 64 entries with each entry having two words. The first word of each entry includes "Byte 0", "Byte 1", "Byte 2" and "Byte3", which define the four byte frame header field that is to be compared against a received frame header field. The second word defines the frame action that buffer memory control circuit 104 is to perform when a frame header field match is found for Bytes 0–3. The frame action field is then applied to comparison output 246, which is coupled to buffer memory control circuit 104.

A variety of actions can be defined in the frame action field. In one embodiment, bit 0 defines a discard frame action. When bit 0 is set, data bytes are discarded until the incoming data frame has been completely received and the EOF flag has been detected. Bit 1 defines a host interrupt action. When bit 1 is set, buffer memory control circuit 104 generates a host processor interrupt DMAC Intp/ after the incoming data frame has been completely received and written into buffer memory 20. Bit 2 defines a send response frame action, and bits 4–7 provide the associated response frame number. When bit 2 is set, buffer memory control circuit 104 provides the 4-bit response frame number to address input 123 of response message table 108, which determines which response frame will be transmitted from the table. The response frame can be transmitted with or without a corresponding sequence number.

Referring to FIG. 6A, response message table 108 stores predetermined response messages that can be transmitted in response to received data frames. Table 108 is essentially a dual port Fast Action RAM (FAR) which is initialized through a first port at data input 134 and address input 136 by host processor 18 (shown in FIG. 5). Data output 122 and address input 123 form the second port. Address input 123 indexes a response data frame within response message table 108 by using the response frame number provided by buffer memory control circuit 104. Response message table 108 can have any length depending on how many response frames are to be stored and the number of bytes within each frame.

FIG. 9 is diagram which illustrates the format of each entry within response message table 108. There can be any number bytes of response data in each response frame. A response frame number of 0x00 would access the data frame beginning at address 0x3000. Similarly, a response frame number of 0x05 would access the data frame beginning at address 0x3050.

Response frames can also be transmitted from response message table 108 by an immediate command executed by host processor 18 from buffer memory 20. When host processor 18 determines that a response frame should be sent, host processor 18 selects the appropriate response frame in table 108 by using an address provided in buffer memory 20 as the address for response message table 108.

Referring again to FIG. 6B, the four Error Flags received by receive data queue 200 are routed through byte to word group collection circuit to buffer memory control circuit 104. The Error Flags are valid only when the EOF flag is set. At the end of a received data frame, buffer memory control circuit 104 writes the Error Flags into a Flag field of a current buffer memory descriptor within buffer memory 20. The buffer memory descriptor is described in more detail below with reference to FIGS. 15, 16, 18 and 19. Data errors are reported in this manner to allow the communications system to process the errored frames by maintaining statistics and discarding errored frames.

The four Error Flags are referred to as "receive data" errors and include an Rx Break/Abort Character Received error, an Async Framing Error, an Rx CRC Error and an Rx Parity Error, for a serial WAN controller. An Rx Break/Abort Character Received error indicates a short frame has been received due an abort or break within the received data. An Async Framing Error indicates the serial WAN controller received a stop bit that was a zero. An Rx CRC Error indicates that the calculated CRC remainder did not match the expected remainder. An Rx Parity Error indicates a parity error was detected on the received data. "Hardware errors" are reported using the DMAC Error/signal output of buffer memory control circuit 104. This signal goes active when a hardware error occurs. The specific error can be read from a DMAC status register within configuration and status register block 212.

The registers within configuration and status register block 212 are shown in FIGS. 10–13. These registers are normally written to or read from during initialization and after an interrupt or error has occurred. In one embodiment, all registers within block 212 are accessed in Big Endian format. FIG. 10 is a diagram which illustrates the contents of a DMAC configuration register 260. DMAC configuration register 260 is used to configure parameters that apply to DMA controller 16 and all multiplexed channels. Bit 4 allows host processor 18 to reset DMA controller 16 by first writing bit 4 to a "1" to assert the reset signal and then writing bit 4 back to a "0" to inactivate the reset signal. Bit 2 enables DMA controller 16 to perform two and four word bursts to access buffer memory 20. When bit 2 is enabled, DMA controller 16 will burst two and four words automatically when the buffer memory address is on an 8 and 16 byte boundary, respectively. When bit 2 is disabled, DMA controller 16 accesses buffer memory 20 one word at a time. Bit 1 enables DMA controller 16 to transmit data from buffer memory 20 to interface controller 14. Bit 0 enables DMA controller 16 to receive data from interface 16 and to transmit the data to buffer memory 20.

FIG. 11 is a diagram which illustrates the bit definitions of a channel enable register 262 within block 212. Channel enable register 262 allows the user to selectively enable individual channels in DMA controller 16. A bit value of "1" enables the channel number that corresponds to the bit position number while a bit value of "0" disables the channel. For example, setting bit four will enable channel number 4.

FIG. 12 is a diagram which illustrates the bit definitions of DMAC status register 264 within block 212. Bit 15 indicates whether the transmit buffer memory descriptor is not ready. Bit 15 goes active when DMA controller 16 has fetched a buffer memory descriptor (BMD) from buffer memory 20 and the valid bit in the BMD has not yet been set. When this bit gets set, the transmit section for the particular channel becomes inactive until re-enabled by host processor 18. Bits 12-8 identify the number of the channel that is not ready.

Bit 15 interrupts are only reported if a subsequent BMD (not the first BMD of a data frame) is not ready. After the last buffer of a data frame has been processed, DMA controller 16 will fetch the next BMD from the BMD list. If the valid flag in this next BMD is set, then DMA controller 16 will continue to transmit more data. If the valid flag is not set, DMA controller 16 will halt the transmit section for that channel by clearing a corresponding BMD pointer active flag in a BMD pointer register within block 212, as discussed with reference to FIG. 13.

Bit 14 indicates whether a receive buffer memory descriptor within buffer memory 20 is not ready. Bit 14 will go active after DMA controller 16 has fetched a buffer memory descriptor from buffer memory 20 and the valid bit in the descriptor is not set. When this bit gets set, the receive section will become inactive until re-enabled by host processor 18. Bits 12-8 of the DMAC status register 264 identify the channel number that is not ready. Bits 3–7 identify hardware errors. Five hardware errors are reported through bits 3–7, including a transmit data queue overrun error which indicates that transmit data queue 150 was full when transmit data was written; a transmit word group queue overrun error which indicates that transmit word group queue 154 was full when transmit data was written; a receive data queue underrun which indicates that receive data queue 200 was empty when receive data was read; a receive word group queue underrun which indicates receive word group queue 204 was empty when receive data was read; and a uP data parity error which indicates a parity error was detected on the data bus 24 during a transmit operation. Bits 1 and 0 indicate whether the transmit completion and receive completion interrupts are active.

The DMAC Error/signal at the output of buffer memory control circuit 104 goes active when bits 7, 6, 5, 4 or 3 in DMAC status register 264 go active. The DMAC Intp/ signal at the output of buffer memory control circuit 104 goes active when bits 15, 14, 1 or 0 in DMAC status register 264 go active.

FIG. 13 is a diagram which illustrates the bit definitions of the buffer memory descriptor (BMD) pointer registers within block 212. BMD pointer registers 266 include one transmit BMD pointer and one receive BMD pointer for each channel number, which point to the addresses of the active transmit buffer memory descriptor and the active receive memory descriptor in buffer memory 20. These descriptors provide the transmit and receive parameters for the data presently being transmitted and received. The BMD pointers are updated by DMA controller 16.

Bit 0 of each pointer is the pointer active flag. This flag informs DMA controller 16 whether the channel is active and whether DMA controller 16 can access the buffer memory descriptor in buffer memory 20. The pointer active flag is set by host processor 18 when it has set up valid descriptors in buffer memory 20. The pointer active flag is cleared by DMA controller 16 when it finds a descriptor that is not valid.

FIG. 14 is a diagram which illustrates the data structure in buffer memory 20 for a sequential BMD list. Buffer memory 20 includes sequential BMD list 270 and a plurality of data buffer locations 272. BMD list 270 includes a plurality of buffer memory descriptors 274. Each descriptor 274 includes several fields, including a byte count field 276, an immediate command field 278, a BMD flags field 280 and a buffer memory address field 282. There is one transmit BMD list 270 and one receive BMD list 270 for each channel. Each BMD pointer register 266 points to the presently active descriptor 274 within the corresponding BMD list 270. When the BMD pointer reaches the end of a BMD list, the BMD pointer is wrapped back around to point to the beginning of the BMD list.

FIG. 15 is diagram which illustrates the format of each descriptor 274 within BMD list 270 in greater detail. Each descriptor 274 within BMD list 270 is eight bytes long and is divided into two words, Word 0 and Word 1. Bits 31-16 of Word 0 are the byte count field 276 for data buffer 272. On transmit operations, this field specifies the number of bytes that are to be transferred from data buffer 272. On receive operations, this field is used for two different purposes. When host processor 18 first sets up BMD list 270, this field defines how many bytes can be written into data buffer 272 (number of available bytes). After DMA controller 16 transfers the data into buffer 272, DMA controller 16 overwrites this field with the actual number of bytes that were written into buffer 272.

Bits 15-8 of Word 0 are the immediate command field 278, which is shown in more detail in FIG. 16. Bits 7-0 of Word 0 are the BMD flags field 280, which is shown in more detail in FIG. 16.

Bits 31-0 of Word 1 are the buffer memory address field 282 of data buffer 272, which points to the address of the first data byte of the data within data buffer 272.

FIG. 16 illustrates the bit definitions of immediate command field 278 and flags field 280. Bit 8 of Word 0 in the immediate command field indicates whether a response frame should be sent. When this bit is a 1, DMA controller 16 transmits a data frame from response message table 108. Byte count field 276 defines the number of bytes to send. Buffer address field 282 (shown in FIG. 15) gives the starting address in response message table 108 from which to transmit the data.

Bits 7-4 of Word 0 in flags field 280 are the four error flags that are received from receive data queue 200. These flags are valid when the end of frame (EOF) flag, bit 1 of Word 0, is also set. At the end of a received data frame, DMA controller 16 writes these flags to the flags field 280 of the current buffer memory descriptor 274.

Bit 3 of Word 0 defines a buffer completion interrupt, which allows DMA controller 16 to activate the DMAC Intp/ signal when the data transfer has taken place for the current descriptor 274. If this bit is "0", no interrupt signal will activate and DMA controller 16 will continue to the next descriptor 274 in BMD list 270.

Bit 2 of Word 0 identifies the start of a frame (SOF) and is a "1" when descriptor 274 contains the parameters for the first buffer of a data frame. Bit 1 of Word 0 identifies the end of a frame (EOF), and is a "1" when descriptor 274 contains the parameters for the last buffer of a data frame. If this bit is a "0", the end of a data frame has not been reached and DMA controller 16 will continue to the next descriptor 274 in BMD list 270. The entire data frame is contained in one data buffer 272 when both the start of frame and end of frame flags are set in one descriptor 274.

Bit 0 of Word 1 is a valid parameter, which is a "1" when the descriptor contains valid parameters for a data buffer and a data transfer can take place with buffer memory 20. If this bit is a "0", then a data transfer with buffer memory 20 cannot take place. BMD pointer active flag, bit 0 of BMD pointer register 266, will be cleared by DMA controller 16 and the DMAC Intp/signal will be activated.

FIG. 17 is a diagram which illustrates the data structure in buffer memory 20 for a linked BMD list 290 according to an alternative embodiment of the present invention. Linked BMD list 290 includes a set of link accessed buffer memory descriptors 292, which point to data within a data buffer 294. BMD pointer register 266 points to the first descriptor 292 in linked list 290. Each descriptor 292 includes a byte count field 300, an immediate command field 302, a BMD flags field 304, a buffer address field 306 and a next BMD pointer field 308. Byte count field 300, immediate command field 302, BMD flags field 304 and buffer address field 306 are substantially the same as the corresponding fields shown in FIGS. 15 and 16 and are used in a similar manner. The next BMD pointer field 308 points to the next descriptor 292 in linked list 290. When DMA controller 16 reaches the end of a BMD list 290, the next BMD pointer field 308 of the last descriptor 292 is equal to "0".

When DMA controller 16 removes one or more descriptors 292 from linked list 290, it sets its current BMD pointer 266 equal to the next BMD pointer 308 of the current descriptor 292. When host processor 18 adds one or more descriptors 292 to the end of linked list 290, it sets the next BMD pointer field 308 of the last descriptor 292 equal to the buffer memory address of the first descriptor 292 that is being added. Host processor 18 can also add one or more descriptors to the middle of a linked list 290 by modifying the next BMD pointer field 308 of a descriptor 292 to insert the subsequent link and by modifying the next BMD pointer field 308 of the last added descriptor 292 to complete the link operation.

FIGS. 18 and 19 are diagrams which illustrate the format of a descriptor 292 in greater detail. Each descriptor 292 is 16 bytes long and is divided into four words. Bits 31-16 of Word 0 contain byte count field 300. Bits 15-8 Word 0 contain intermediate command field 302. Bits 7-0 of Word 0 contain BMD flags field 304. Bits 31-0 of Word 1 contain buffer memory address field 306. Bits 31-0 of Word 2 contain next BMD pointer field 308. This is the address in buffer memory 20 of the next descriptor 292 in linked list 290. Since a descriptor 292 starts on a 16 byte address boundary, bits 3-0 of next BMD pointer field 308 are expected to be zero. Bits 31-0 of Word 3 are not used.

CONCLUSION

The DMA controller of the present invention improves efficiency the host processor and the host processor data bus in several ways. First, the DMA controller has enhanced data frame processing capability which relieves the host processor from much of the burden of deciding what to do with an incoming data frame. Predetermined commands are now stored in the receive frame action table within the DMA controller. One of the commands stored in the receive frame action table is to automatically create a response frame. If a response frame needs to be sent as an acknowledgment to an incoming data frame, the host processor does not have to build the response frame. An appropriate, predetermined response frame is already residing in a response message table within the DMA controller. Also, the host processor does not need to notify the DMA controller to transfer the response frame. The receive frame action table automatically notifies the buffer memory control circuit when to send a response frame from the response message table. Finally, the DMA controller does not need to use the host processor data bus to send the response frame. Since the response frame is transferred from the response message table, which is part of the DMA controller, the DMA controller does not need to access the host processor data bus. The host processor maintains control over all aspects of data frame decision making and response frame generation since the queue # lookup table, the receive frame action table and the response message table are all programmable by the host processor.

Although the present invention has been described with reference to preferred embodiments, workers skilled in the art will recognize that changes may be made in form and detail without departing from the spirit and scope of the invention. For example, the number of channels, bytes, and bits used in the various elements of the DMA controller of the present invention are arbitrary and can be varied as desired in alternative embodiments. Also, the particular data formats and structures of the various tables and queues can be varied in alternative embodiments. The term "coupled" used in the specification and the claims includes various types of connections or couplings and can include a direct connection or a connection through one or more intermediate components.

What is claimed is:

1. A direct memory access (DMA) controller for transmitting and receiving formatted data frames having frame headers in a communications subsystem, the DMA controller comprising:

a transmit data input and a transmit data output;

transmit circuitry receiving transmit data frames on the transmit data input and applying the transmit data frames on the transmit data output through a transmit data path;

a receive data input and a receive data output;

receive circuitry receiving receive data frames on the receive data input and applying the receive data frames on the receive data output through a receive data path; and a response message table having an address input coupled to the receive circuitry, a data output coupled to the transmit data path of the transmit circuitry and a plurality of addressable memory locations for storing predetermined response data frames associated with particular ones of the receive data frames.

2. The DMA controller of claim 1 and further comprising:

a receive frame header capture circuit having a data input coupled to the receive data circuitry for capturing the frame header of each receive data frame and having a data output; and a receive frame action table having an input coupled to the data output of the receive frame header capture circuit, a plurality of addressable memory locations for storing predetermined action commands, and an action command output which is coupled to the address input of the response message table.

3. The DMA controller of claim 2 wherein the receive frame header capture circuit comprises a memory array.

4. The DMA controller of claim 2 wherein the receive frame action table comprises:

a contents addressable memory (CAM) having a comparison input coupled to the data output of the receive frame header capture circuit and a comparison output provided to the address input of the response message table, wherein each addressable memory location in the CAM includes a frame header field and an associated frame action field and wherein the associated frame action field is applied to the comparison output if the captured frame header corresponds to the frame header field of that memory location.

5. The DMA controller of claim 4 wherein the associated frame action field comprises a send response frame action field which identifies whether a response data frame shall be transmitted from the response message table and a response frame number field which identifies an address in the response message table at which the response data frame is stored.

6. The DMA controller of claim 5 wherein the associated action field further comprises a discard frame action field and a host processor interrupt action field.

7. The DMA controller of claim 1 wherein the response message table comprises a random access memory.

8. A direct memory access (DMA) controller for transmitting and receiving formatted data frames having frame headers in a communications subsystem, the DMA controller comprising:

a transmit data input and a transmit data output;

transmit circuitry receiving transmit data frames on the transmit data input and applying the transmit data frames on the transmit data output;

a receive data input and a receive data output;

receive circuitry receiving receive data frames on the receive data input and applying the receive data frames on the receive data output;

a receive frame action table having an input coupled to the receive circuitry, a plurality of memory locations for storing predetermined action commands which are addressed by the frame headers, and an action command output;

a receive frame header capture circuit having a data input coupled to the receive circuitry for capturing the frame header of each receive data frame and having a data output coupled to the input of the receive frame action table; and wherein the receive frame action table comprises a contents addressable memory (CAM) having a comparison input coupled to the data output of the receive frame header capture circuit and a comparison output which forms the action command output, wherein each addressable memory location in the CAM includes a frame header field and an associated frame action field and wherein the associated frame action field is applied to the comparison output if the captured frame header corresponds to the frame header field of that memory location.

9. The DMA controller of claim 8 and further comprising:

a response message table having an address input coupled to the comparison output, a data output coupled to the transmit circuitry and a plurality of addressable memory locations for storing predetermined response data frames.

10. The DMA controller of claim 9 wherein the associated frame action field comprises a send response frame action field which identifies whether a response data frame shall be transmitted from the response message table and a response frame number field which identifies an address in the response message table at which the response data frame is stored.

11. The DMA controller of claim 9 wherein the associated frame action field further comprises a discard frame action field and a host processor interrupt action field.

12. A communications subsystem for transmitting and receiving formatted data frames having frame headers, the communications subsystem comprising:

a communications interface;

a host processor interface;

a host processor and a buffer memory coupled to the host processor interface; and a direct memory access (DMA) controller coupled between the communications interface and the host processor interface, the DMA controller comprising:

a transmit circuit which receives transmit data frames on the host processor interface and applies the transmit data frames to the communications interface;

a receive circuit which receives receive data frames on the communications interface and applies the receive data frames to the host processor interface;

a receive frame action table having a frame header input coupled to the receive circuit, a frame action output and a plurality of frame action memory locations which are addressed by the frame header input; and a response message table having a first address input coupled to the frame action output, a response message output coupled to the transmit circuit and a plurality of response message memory locations which are addressed by the frame action output.

13. The communications subsystem of claim 12 wherein each frame action memory location comprises:

a send response frame field which identifies whether a response frame shall be transmitted from the response message table in response to the receive data frame; and a response frame identifier field which identifies the response memory location from which the response frame will be transmitted.

14. The communications subsystem of claim 12 and further comprising:

a receive frame header capture circuit having a data input coupled to the receive circuitry for capturing the frame header of each receive data frame and having a data output coupled to the frame header input of the receive frame action table.

15. The communications subsystem of claim 12 wherein the receive frame action table comprises:

a contents addressable memory (CAM) having a comparison input coupled to the data output of the receive frame header capture circuit and a comparison output which forms the frame action output, wherein each frame action memory location in the CAM includes a send response frame action field, a response frame identifier field and a frame header field which is compared with the frame header applied to the frame header input.

16. The communications subsystem of claim 15 wherein each frame action memory location further comprises a discard frame action field and a host processor interrupt action field.

17. The communications subsystem of claim 15 wherein the CAM further comprises a data input and an address input which are coupled to the host processor interface.

18. The communications subsystem of claim 15 wherein the DMA controller further comprises:

a lookup table having first and second data ports, first and second address inputs and a plurality of table entries with a mask field which is applied to the first data port when addressed by the first address input, wherein the first address input is coupled to the receive circuit and the second address input and second data port are coupled to the host processor interface; and wherein the CAM further comprises a mask input coupled to the first data port, which masks the frame header field applied to the frame header input.

19. The communications subsystem of claim 12 wherein the response message table comprises a dual port random access memory having a first port which includes the first address input and the response message output and a second port which includes a second address input and a data input which are coupled to the host processor interface.

20. The communications subsystem of claim 12 wherein the buffer memory comprises:

a list of buffer memory descriptors, each descriptor having a byte count field, an immediate command field and a buffer memory address field, wherein the immediate command field comprises a send response frame field which identifies whether a response frame shall be transmitted from the response message table.

21. A communications subsystem for transmitting and receiving formatted data frames having frame headers, the communications subsystem comprising:

a communications interface;

a host processor interface;

a host processor and a buffer memory coupled to the host processor interface; and a direct memory access (DMA) controller coupled between the communications interface and the host processor interface, the DMA controller comprising:

transmit means for receiving transmit data frames on the host processor interface and applying the transmit data frames to the communications interface;

receive means for receiving receive data frames on the communications interface and applying the receive data frames to the host processor interface;

frame action determination means for determining an action to be performed on each receive data frame as a function of the frame header; and response message generator means for generating a response frame and applying the response frame to the transmit means as a function of the action determined by the frame action determination means.

22. The communications subsystem of claim 21 wherein the response generator means comprises means for storing a plurality of predetermined response frames which are addressed by the action determined by the frame action determination means.

23. The communications subsystem of claim 21 wherein the buffer memory comprises means for initiating transmission of a selected predetermined response frame stored in the response message generator means by the transmit means.

24. The communications subsystem of claim 21 wherein the frame action determination means comprises means for storing predetermined frame header fields and associated frame action fields which are addressed by the frame headers of the receive data frames.

25. The communications subsystem of claim 24 wherein the DMA controller further comprises:

means for capturing the frame header of each receive data frame and applying the frame header to the frame action determination means.

26. A method of processing a formatted data frame having a frame header in a communications subsystem which comprises a communications interface, a DMA controller and a host processor interface, the method comprising:

receiving the data frame within the DMA controller from the communications interface;

capturing the frame header from the received data frame within the DMA controller;

applying the received data frame to the host processor interface;

applying the frame header to a comparison input of a contents addressable memory (CAM) which has a plurality of addressable memory locations, each addressable memory location having a frame header field and an associated frame action field and wherein the associated frame action field is applied to a comparison output of the CAM if the frame header corresponds to the frame header field;

generating a predetermined response frame within the DMA controller as a function of the associated frame action field applied to the comparison output; and transmitting the response frame from the DMA controller to the communications interface.

* * * * *